US006977026B2

(12) United States Patent
Liu et al.

(10) Patent No.: US 6,977,026 B2
(45) Date of Patent: *Dec. 20, 2005

(54) METHOD FOR APPLYING SOFTENING COMPOSITIONS TO A TISSUE PRODUCT

(75) Inventors: Kou-Chang Liu, Appleton, WI (US); Daniel Vander Heiden, Menasha, WI (US); Strong C. Chuang, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 35 days.

This patent is subject to a terminal disclaimer.

(21) Appl. No.: 10/272,470

(22) Filed: Oct. 16, 2002

(65) Prior Publication Data

US 2004/0074622 A1 Apr. 22, 2004

(51) Int. Cl.[7] .............................................. D21H 17/00
(52) U.S. Cl. ..................... 162/164.4; 162/179; 162/109; 162/111; 162/112; 162/113; 427/210; 427/209; 427/288; 428/154; 428/156; 428/195
(58) Field of Search .............................. 162/164.4, 179, 162/109, 111, 112, 113; 427/210, 209, 288; 428/154, 156, 195

(56) References Cited

U.S. PATENT DOCUMENTS

| 2,345,543 A | 3/1944 | Wohnsicdler et al. |
| 2,926,116 A | 2/1960 | Keim |
| 2,926,154 A | 2/1960 | Keim |
| 3,556,932 A | 1/1971 | Coscia et al. |
| 3,556,933 A | 1/1971 | Stamford et al. |
| 3,700,623 A | 10/1972 | Keim |
| 3,722,469 A | 3/1973 | Bartley et al. |
| 3,772,076 A | 11/1973 | Keim |
| 3,849,241 A | 11/1974 | Butin et al. |
| 3,865,078 A | 2/1975 | De Howitt et al. |
| 3,885,158 A | 5/1975 | Flutie et al. |
| 3,899,388 A | 8/1975 | Petrovich et al. |

(Continued)

FOREIGN PATENT DOCUMENTS

| DE | 252208 | 10/1912 |
| EP | 0047908 A1 | 3/1982 |

(Continued)

OTHER PUBLICATIONS

PCT Search Report, Nov. 05, 2003.
Article –New technology to apply starch and other additives, M. Foulger, J. Parisian, H. P. Didwania, and J. Taylor, Pulp & Paper Canada, vol. 100, No. 2, 1999, pp. 24–25.

*Primary Examiner*—Mark Halpern
(74) *Attorney, Agent, or Firm*—Dority & Manning, P.A.

(57) ABSTRACT

A method for applying a softening composition to a paper web of a tissue product is provided. The softening composition is applied primarily to the elevated regions of the tissue product. The application of the softening composition in this manner allows for the use of hydrophobic softeners, such as amino-functionalized polysiloxanes, in an amount of from about 0.05% to about 5% by weight of the tissue product while maintaining a Wet Out Time of less than about 10 seconds.

38 Claims, 2 Drawing Sheets

U.S. PATENT DOCUMENTS

| | | |
|---|---|---|
| 3,905,329 A | 9/1975 | Cone et al. |
| 3,930,465 A | 1/1976 | Schuierer |
| 4,005,028 A | 1/1977 | Heckert |
| 4,005,030 A | 1/1977 | Heckert |
| 4,016,831 A | 4/1977 | James et al. |
| 4,023,526 A | 5/1977 | Ashmus et al. |
| 4,061,001 A | 12/1977 | Von Der Eltz et al. |
| 4,081,318 A | 3/1978 | Wietsma |
| 4,089,296 A | 5/1978 | Barchi |
| 4,099,913 A | 7/1978 | Walter et al. |
| 4,118,526 A | 10/1978 | Gregorian et al. |
| 4,129,528 A | 12/1978 | Petrovich et al. |
| 4,147,586 A | 4/1979 | Petrovich et al. |
| 4,158,076 A | 6/1979 | Wallsten |
| 4,159,355 A | 6/1979 | Kaufman |
| 4,184,914 A | 1/1980 | Jenkins |
| 4,193,762 A | 3/1980 | Namboodri |
| 4,198,316 A | 4/1980 | Nahta |
| 4,222,921 A | 9/1980 | Van Eenam |
| 4,230,746 A | 10/1980 | Nahta |
| 4,237,818 A | 12/1980 | Clifford et al. |
| 4,263,344 A | 4/1981 | Radvan et al. |
| 4,276,339 A | 6/1981 | Stoveken |
| 4,279,964 A | 7/1981 | Heller |
| 4,288,475 A | 9/1981 | Meeker |
| 4,297,860 A | 11/1981 | Pacifici et al. |
| 4,305,169 A | 12/1981 | Vidalis |
| 4,343,835 A | 8/1982 | Jones et al. |
| 4,348,251 A | 9/1982 | Pauls et al. |
| 4,364,784 A | 12/1982 | Van Wersch et al. |
| 4,366,682 A | 1/1983 | Keller |
| 4,384,867 A | 5/1983 | Grüber |
| 4,385,954 A | 5/1983 | Pauls et al. |
| 4,387,118 A | 6/1983 | Shelton |
| 4,400,953 A | 8/1983 | Driessen et al. |
| 4,402,200 A | 9/1983 | Clifford et al. |
| 4,408,996 A | 10/1983 | Baldwin |
| 4,435,965 A | 3/1984 | Sasseville et al. |
| 4,440,808 A | 4/1984 | Mitter |
| 4,442,771 A | 4/1984 | Mitter |
| 4,444,104 A | 4/1984 | Mitter |
| 4,453,462 A | 6/1984 | Mitter |
| 4,463,467 A | 8/1984 | Grüber et al. |
| 4,463,583 A | 8/1984 | Krüger et al. |
| 4,474,110 A | 10/1984 | Rosner |
| 4,497,273 A | 2/1985 | Mitter |
| 4,498,318 A | 2/1985 | Mitter |
| 4,501,038 A | 2/1985 | Otting |
| 4,502,304 A | 3/1985 | Hopkins |
| 4,529,480 A | 7/1985 | Trokhan |
| 4,534,189 A | 8/1985 | Clifford |
| 4,551,199 A | 11/1985 | Weldon |
| 4,552,778 A | 11/1985 | Zimmer |
| 4,557,218 A | 12/1985 | Sievers |
| 4,559,243 A | 12/1985 | Pässler et al. |
| 4,562,097 A | 12/1985 | Walter et al. |
| 4,571,360 A | 2/1986 | Brown et al. |
| 4,576,112 A | 3/1986 | Funger et al. |
| 4,581,254 A | 4/1986 | Cunningham et al. |
| 4,597,831 A | 7/1986 | Anderson |
| 4,603,176 A | 7/1986 | Bjorkquist et al. |
| 4,605,702 A | 8/1986 | Guerro et al. |
| 4,612,874 A | 9/1986 | Mitter |
| 4,618,689 A | 10/1986 | Traver et al. |
| 4,646,675 A | 3/1987 | Arthur et al. |
| 4,655,056 A | 4/1987 | Zeiffer |
| 4,665,723 A | 5/1987 | Zimmer |
| 4,667,882 A | 5/1987 | Pacifici |
| 4,699,988 A | 10/1987 | Traver et al. |
| 4,731,092 A | 3/1988 | Berendt |
| 4,734,100 A | 3/1988 | Berendt et al. |
| 4,741,739 A | 5/1988 | Berendt et al. |
| 4,762,727 A | 8/1988 | Voswinckel |
| 4,773,110 A | 9/1988 | Hopkins |
| 4,778,477 A | 10/1988 | Lauchenauer |
| 4,792,619 A | 12/1988 | Berendt et al. |
| 4,799,278 A | 1/1989 | Beeh |
| 4,833,748 A | 5/1989 | Zimmer et al. |
| 4,872,325 A | 10/1989 | Moser et al. |
| 4,894,118 A | 1/1990 | Edwards et al. |
| 4,911,956 A | 3/1990 | Gabryszewski et al. |
| 4,912,948 A | 4/1990 | Brown et al. |
| 4,943,350 A | 7/1990 | Bogart et al. |
| 4,950,545 A | 8/1990 | Walter et al. |
| 5,008,131 A | 4/1991 | Bakhshi |
| 5,009,932 A | 4/1991 | Klett et al. |
| 5,048,589 A | 9/1991 | Cook et al. |
| 5,059,282 A | 10/1991 | Ampulski et al. |
| 5,089,296 A | 2/1992 | Bafford et al. |
| 5,098,979 A | 3/1992 | O'Lenick, Jr. |
| 5,145,527 A | 9/1992 | Clifford et al. |
| 5,164,046 A | 11/1992 | Ampulski et al. |
| 5,165,261 A | 11/1992 | Cho |
| 5,215,626 A | 6/1993 | Ampulski et al. |
| 5,219,620 A | 6/1993 | Potter et al. |
| 5,227,023 A | 7/1993 | Pounder et al. |
| 5,227,242 A | 7/1993 | Walter et al. |
| 5,237,035 A | 8/1993 | O'Lenick, Jr. et al. |
| 5,245,545 A | 9/1993 | Taylor |
| 5,246,545 A | 9/1993 | Ampulski et al. |
| 5,246,546 A | 9/1993 | Ampulski |
| 5,328,565 A | 7/1994 | Rasch et al. |
| 5,328,685 A | 7/1994 | Janchiraponvej et al. |
| 5,340,609 A | 8/1994 | Arthur et al. |
| 5,366,161 A | 11/1994 | Potter et al. |
| 5,385,643 A | 1/1995 | Ampulski |
| 5,389,204 A | 2/1995 | Ampulski |
| 5,399,412 A | 3/1995 | Sudall et al. |
| 5,466,337 A | 11/1995 | Darlington et al. |
| 5,492,655 A | 2/1996 | Morton et al. |
| 5,505,997 A | 4/1996 | Strong et al. |
| 5,510,001 A | 4/1996 | Hermans et al. |
| 5,525,345 A | 6/1996 | Warner et al. |
| 5,529,665 A | 6/1996 | Kaun |
| 5,538,595 A | 7/1996 | Trokhan et al. |
| 5,552,020 A | 9/1996 | Smith et al. |
| 5,558,873 A | 9/1996 | Funk et al. |
| 5,573,637 A | 11/1996 | Ampulski et al. |
| 5,591,306 A | 1/1997 | Kaun |
| 5,591,309 A | 1/1997 | Rugowski et al. |
| 5,601,871 A | 2/1997 | Krzysik et al. |
| 5,605,719 A | 2/1997 | Tench et al. |
| 5,607,980 A | 3/1997 | McAtee et al. |
| 5,614,293 A | 3/1997 | Krzysik et al. |
| 5,623,043 A | 4/1997 | Fost et al. |
| 5,624,676 A | 4/1997 | Mackey et al. |
| 5,635,191 A | 6/1997 | Roe et al. |
| 5,635,469 A | 6/1997 | Fowler et al. |
| 5,637,194 A | 6/1997 | Ampulski et al. |
| 5,643,588 A | 7/1997 | Roe et al. |
| 5,650,218 A | 7/1997 | Krzysik et al. |
| 5,656,132 A | 8/1997 | Farrington, Jr. et al. |
| 5,665,426 A | 9/1997 | Krzysik et al. |
| 5,667,636 A | 9/1997 | Engel et al. |
| 5,688,496 A | 11/1997 | Fost et al. |
| 5,705,164 A | 1/1998 | Mackey et al. |
| 5,707,434 A | 1/1998 | Halloran et al. |
| 5,707,435 A | 1/1998 | Halloran |
| 5,725,736 A | 3/1998 | Schroeder et al. |
| 5,756,112 A | 5/1998 | Mackey |
| 5,792,737 A | 8/1998 | Grüning et al. |

| | | | | | | |
|---|---|---|---|---|---|---|
| 5,807,956 | A | 9/1998 | Czech | 6,599,394 B1 | 7/2003 | Liu et al. |
| 5,814,188 | A | 9/1998 | Vinson et al. | 6,607,783 B1 * | 8/2003 | Vander Heiden et al. ... 427/210 |
| 5,830,483 | A | 11/1998 | Seidel et al. | 6,706,410 B2 | 3/2004 | Horenziak et al. |
| 5,840,403 | A * | 11/1998 | Trokhan et al. ............. 428/154 | 2002/0092635 A1 | 7/2002 | Capizzi |
| 5,849,313 | A | 12/1998 | Fost et al. | 2002/0112831 A1 | 8/2002 | Bamholtz et al. |
| 5,856,544 | A | 1/1999 | Czech et al. | 2002/0112835 A1 | 8/2002 | Liu et al. |
| 5,857,627 | A | 1/1999 | Horwell et al. | 2002/0139500 A1 | 10/2002 | Runge et al. |
| 5,861,143 | A | 1/1999 | Peterson et al. | 2003/0032352 A1 | 2/2003 | Chang et al. |
| 5,869,075 | A | 2/1999 | Krzysik | 2003/0056917 A1 | 3/2003 | Jimenez |
| 5,871,763 | A | 2/1999 | Luu et al. | 2003/0118847 A1 | 6/2003 | Chaung et al. |
| 5,882,573 | A | 3/1999 | Kwok et al. | 2003/0118848 A1 | 6/2003 | Liu |
| 5,885,697 | A | 3/1999 | Krzysik et al. | 2003/0188839 A1 | 10/2003 | Urscheler |
| 5,893,965 | A | 4/1999 | Trokhan et al. | 2003/0188841 A1 | 10/2003 | Buder et al. |
| 5,902,540 | A | 5/1999 | Kwok | 2003/0221808 A1 | 12/2003 | Capizzi |
| 5,904,298 | A | 5/1999 | Kwok et al. | | | |
| 5,904,809 | A | 5/1999 | Rokman et al. | FOREIGN PATENT DOCUMENTS | | |
| 5,925,469 | A | 7/1999 | Gee | EP | 0098362 B1 | 1/1984 |
| 5,932,068 | A | 8/1999 | Farrington, Jr. et al. | EP | 0120472 A1 | 10/1984 |
| 5,935,383 | A | 8/1999 | Sun et al. | EP | 0195458 A1 | 9/1986 |
| 5,981,044 | A | 11/1999 | Phan et al. | EP | 0196576 B1 | 4/1989 |
| 5,981,681 | A | 11/1999 | Czech | EP | 0333212 A2 | 9/1989 |
| 5,985,434 | A | 11/1999 | Qin et al. | EP | 0336439 A2 | 10/1989 |
| 5,990,377 | A | 11/1999 | Chen et al. | EP | 0643083 | 3/1995 |
| 6,017,417 | A | 1/2000 | Wendt et al. | EP | 0347153 B1 | 5/1995 |
| 6,030,675 | A | 2/2000 | Schroeder et al. | EP | 0347177 B1 | 10/1995 |
| 6,033,723 | A | 3/2000 | Kistler et al. | EP | 0347154 B1 | 3/1996 |
| 6,054,020 | A | 4/2000 | Goulet et al. | EP | 0347176 B2 | 2/1997 |
| 6,077,375 | A | 6/2000 | Kwok | EP | 1013823 | 6/2000 |
| 6,080,686 | A | 6/2000 | Floyd | EP | 1023863 A1 | 8/2000 |
| 6,090,885 | A | 7/2000 | Kuo et al. | EP | 10590321 A1 | 12/2000 |
| 6,103,128 | A | 8/2000 | Koso et al. | EP | 1149947 A2 | 10/2001 |
| 6,120,784 | A | 9/2000 | Snyder, Jr. | EP | 1236827 A1 | 9/2002 |
| 6,126,784 | A | 10/2000 | Ficke et al. | WO | WO 95/01478 | 1/1995 |
| 6,132,803 | A | 10/2000 | Kelly et al. | WO | WO 9704171 A1 | 2/1997 |
| 6,136,147 | A | 10/2000 | Edwards et al. | WO | WO 9840207 A1 | 9/1998 |
| 6,179,961 | B1 | 1/2001 | Ficke et al. | WO | WO 98/40425 | 9/1998 |
| 6,183,814 | B1 | 2/2001 | Nangeroni et al. | WO | WO 9913158 A1 | 3/1999 |
| 6,217,707 | B1 | 4/2001 | Garvey et al. | WO | WO 9919081 A1 | 4/1999 |
| 6,217,940 | B1 | 4/2001 | Kuni | WO | WO 0015907 A1 | 3/2000 |
| 6,224,714 | B1 | 5/2001 | Schroeder et al. | WO | WO 0068503 A1 | 11/2000 |
| 6,231,719 | B1 | 5/2001 | Garvey et al. | WO | WO 0071177 A1 | 11/2000 |
| 6,238,518 | B1 | 5/2001 | Rokman et al. | WO | WO0104416 A1 | 1/2001 |
| 6,238,682 | B1 | 5/2001 | Klofta et al. | WO | WO0114631 | 3/2001 |
| 6,261,580 | B1 | 7/2001 | Lehrter et al. | WO | WO 0128337 A2 | 4/2001 |
| 6,306,408 | B1 | 10/2001 | Eichhorn et al. | WO | WO 0129315 A1 | 4/2001 |
| 6,322,604 | B1 | 11/2001 | Midkiff | WO | WO 0216689 A2 | 2/2002 |
| 6,395,957 | B1 | 5/2002 | Chen et al. | WO | WO 0248458 A1 | 6/2002 |
| 6,432,268 | B1 | 8/2002 | Burghardt | WO | WO03021037 | 3/2003 |
| 6,432,270 | B1 | 8/2002 | Liu et al. | | | |
| 6,514,383 | B1 * | 2/2003 | Liu et al. ................. 162/164.4 | * cited by examiner | | |
| 6,547,928 | B2 | 4/2003 | Barnholtz et al. | | | |

METHOD FOR APPLYING SOFTENING COMPOSITIONS TO A TISSUE PRODUCT

BACKGROUND OF THE INVENTION

It is well known that the application of softeners, such as polysiloxanes, to the surface of a tissue product can impart an improved surface feel to the tissue. However, many softeners are also known to impart hydrophobicity to the treated tissue. Thus, to find a proper balance between softness and absorbency, the softeners have been blended with hydrophilic materials or modified with hydrophilic functional groups. Unfortunately, such hydrophilic compositions are often more expensive and sometimes less effective than their hydrophobic counterparts.

As such, a need currently exists for a method for applying hydrophobic softeners to a tissue product without substantially reducing its absorbency.

SUMMARY OF THE INVENTION

In accordance with one embodiment of the present invention, a method for forming a tissue product is disclosed. The method comprises forming a paper web (e.g., through-dried) having a surface that contains elevated regions and non-elevated regions and applying a softening composition that contains at least one softener to the surface of the paper web so that a greater amount of the softening composition resides on the elevated regions than on the non-elevated regions. The softening composition comprises from about 0.05% to about 5% by weight of the tissue product and the tissue product has a Wet Out Time less than about 10 seconds. In some embodiments, the softener may be hydrophobic. For example, the hydrophobic softener may be selected from the group consisting of polysiloxanes, fatty acid derivatives, and combinations thereof. Moreover, although a variety of techniques may be utilized, one embodiment of the present invention involves applying the softening composition to the paper web as a foam composition.

In accordance with another embodiment of the present invention, a tissue product is disclosed that comprises a paper web that defines a skin-contacting surface of the tissue product. The surface contains elevated regions and non-elevated regions, wherein a softening composition that includes at least one softener is contained on the surface so that a greater amount of the softening composition resides on the elevated regions than on the non-elevated regions. The softening composition comprises from about 0.05% to about 5% by weight of the tissue product and the tissue product has a Wet Out Time less than about 10 seconds.

Other features and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

Figure 1:
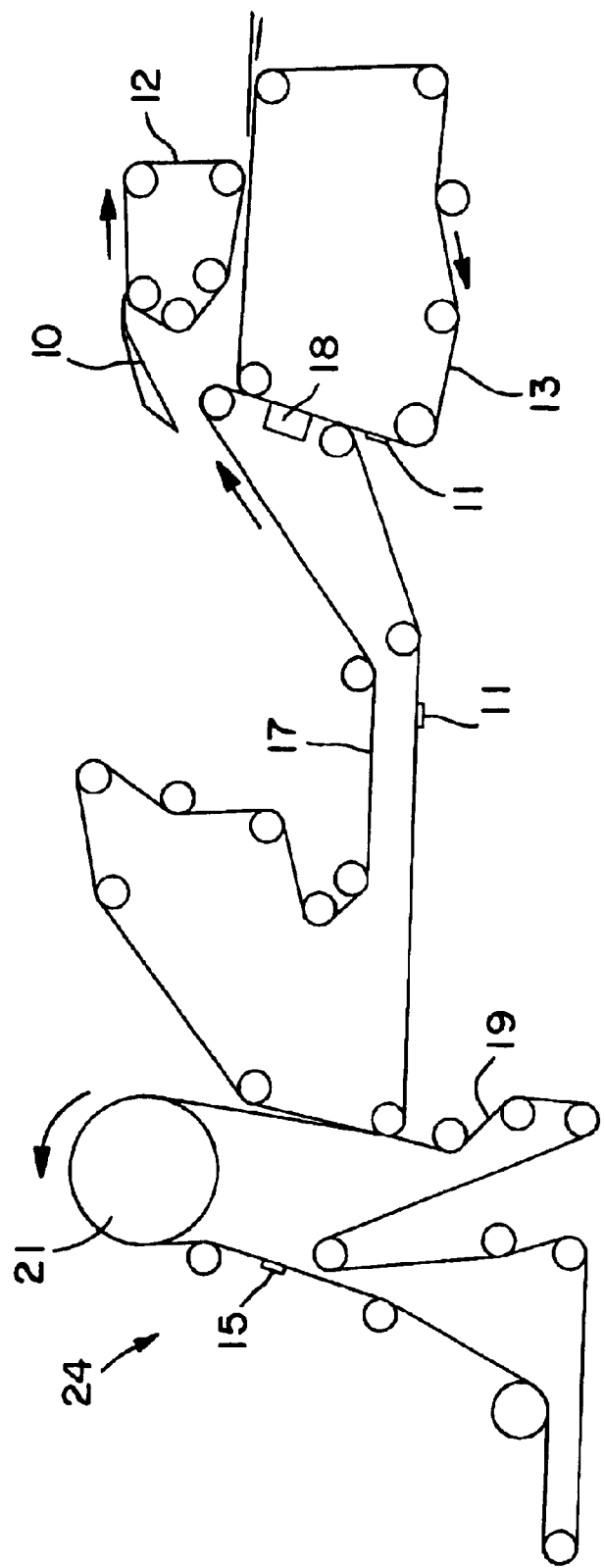
FIG. 1 is a schematic flow diagram of one embodiment of a papermaking process that can be used in the present invention.

Repeat use of reference characters in the present specification and drawings is intended to represent same or analogous features or elements of the present invention.

DETAILED DESCRIPTION OF REPRESENTATIVE EMBODIMENTS

Definitions

As used herein, the terms "foam" or "foam composition" generally refer to a porous matrix that is an aggregate of hollow cells or bubbles, the walls of which contain liquid material. The cells may be interconnected to form channels or capillaries within the foam structure wherein such channels or capillaries facilitate liquid distribution within the foam.

As used herein, a "tissue product" generally refers to various paper-based products, such as facial tissue, bath tissue, paper towels, napkins, and the like. Normally, the basis weight of a tissue product of the present invention is less than about 120 grams per square meter (gsm), in some embodiments less than about 80 grams per square meter, and in some embodiments, from about 10 to about 60 gsm.

As used herein, "Wet Out Time" is related to absorbency and is the time it takes for a given sample to completely wet out when placed in water. More specifically, the Wet Out Time is determined by cutting 20 sheets of the tissue sample into 2.5 inch squares. The number of sheets used in the test is independent of the number of plies per sheet of product. The 20 square sheets are stacked together and stapled at each corner to form a pad. The pad is held close to the surface of a constant temperature distilled water bath (23° C.±2° C.), which is the appropriate size and depth to ensure the saturated specimen does not contact the bottom of the container and the top surface of the water at the same time, and dropped flat onto the water surface, staple points down. The time taken for the pad to become completely saturated, measured in seconds, is the Wet Out Time for the sample and represents the absorbent rate of the tissue. Increases in the Wet Out Time represent a decrease in absorbent rate.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention covers such modifications and variations as come within the scope of the appended claims and their equivalents.

In general, the present invention is directed to a method for applying a softening composition to a paper web of a tissue product. The softening composition is applied primarily to the elevated regions of the tissue product. The application of the softening composition in this manner allows for the use of hydrophobic softeners, such as amino-functionalized polysiloxanes, in an amount of from about 0.05% to about 5% by weight of the tissue product while maintaining a Wet Out Time of less than about 10 seconds.

A. Softening Composition

In accordance with the present invention, as stated above, a softening composition is incorporated into the tissue product to impart a soft feel thereto. The softening composition contains at least one softener in addition to other optional components. For example, in some embodiments, the softener may be a polysiloxane (e.g., amine-functionalized polysiloxane), such as described in U.S. Pat. No. 5,552,020 to Schroeder, et al.; U.S. Pat. No. 5,725,736 to Schroeder, et al.; U.S. Pat. No. 6,030,675 to Schroeder, et al.; U.S. Pat. No. 6,054,020 to Goulet, et al.; U.S. Pat. No. 6,432,268 to Burghardt; and U.S. Pat. No. 6,432,270 to Liu, et al., which are incorporated herein in their entirety by reference thereto for all purposes. Various embodiments of polysiloxanes that may be used as a softener in the present invention will now be described in more detail. For instance, one embodiment of a polysiloxane that may be used in the present invention has the following general structure (1):

$$\text{A}-\underset{R_2}{\overset{R_1}{\underset{|}{\overset{|}{\text{Si}}}}}-\text{O}-[\underset{R_4}{\overset{R_3}{\underset{|}{\overset{|}{\text{Si}}}}}-\text{O}]_m-[\underset{B}{\overset{R_5}{\underset{|}{\overset{|}{\text{Si}}}}}-\text{O}]_p-[\underset{D}{\overset{R_6}{\underset{|}{\overset{|}{\text{Si}}}}}-\text{O}]_q-\underset{R_8}{\overset{R_7}{\underset{|}{\overset{|}{\text{Si}}}}}-\text{A} \quad (1)$$

wherein,

A is hydrogen; hydroxyl; or straight chain, branched or cyclic, unsubstituted or substituted, $C_1$–$C_8$ alkyl or alkoxy radicals;

$R_1$–$R_8$ are independently, a straight chain, branched or cyclic, unsubstituted or substituted, $C_1$–$C_6$ alkyl radical;

m is from 20 to 100,000;

p is from 1 to 5,000;

q is from 0 to 5,000;

B is the following:

$$-R_9-[(OC_2H_5)_r-(OC_3H_7)_s]_t\text{-}G\text{-}(R_{10})_z-W$$

wherein, t=0 or 1;

z is 0 or 1;

r is from 1 to 50,000;

s is from 0 to 50,000;

$R_9$ is a straight chain, branched or cyclic, unsubstituted or substituted, $C_2$–$C_8$ alkylene diradical;

$R_{10}$ is a straight chain, branched or cyclic, unsubstituted or substituted, $C_2$–$C_8$ alkylene diradical or an alkyl cyclic ethereal radical;

G is oxygen or $NR_{11}$, where $R_{11}$ is hydrogen or a straight chain, branched or cyclic, unsubstituted or substituted, $C_1$ to $C_8$ alkyl radical;

when z=0, W is hydrogen or a straight chain, branched or cyclic, unsubstituted or substituted, $C_1$ to $C_{22}$ alkyl radical;

when z=1, W is hydrogen, an $-NR_{12}R_{13}$ radical, or an $-NR_{14}$ radical;

wherein, $R_{12}$ and $R_{13}$ are independently, hydrogen or a straight chain, branched or cyclic, unsubstituted or substituted, $C_1$–$C_8$ alkyl radical; and $R_{14}$ is a straight chain, branched or cyclic, unsubstituted or substituted, $C_3$ to $C_8$ alkylene diradical that forms a cyclic ring with the nitrogen;

D is the following:

$$-R_{15}-(OC_2H_5)_x-(OC_3H_7)_y-O-R_{16}$$

wherein, x is from 1 to 10,000;

y is from 0 to 10,000;

$R_{15}$ is a straight chain, branched or cyclic, unsubstituted or substituted, $C_2$–$C_8$ alkylene diradical, $R_{16}$ is hydrogen or a straight chain, branched or cyclic, unsubstituted or substituted, $C_1$–$C_8$ alkyl radical.

Representative amino-functionalized species within the foregoing general structure (1) include the following (the terms "EO" and "PO" refer to "ethylene oxide" and "propylene oxide" moieties, respectively):

$$CH_3-[\underset{CH_3}{\overset{CH_3}{\underset{|}{\overset{|}{\text{Si}}}}}-\text{O}]_m-[\underset{(CH_2)_3}{\overset{CH_3}{\underset{|}{\overset{|}{\text{Si}}}}}-\text{O}]_p-[\underset{(CH_2)_3}{\overset{CH_3}{\underset{|}{\overset{|}{\text{Si}}}}}-\text{O}]_q-\underset{CH_3}{\overset{CH_3}{\underset{|}{\overset{|}{\text{Si}}}}}-CH_3$$

with side chains: $O-CH_2-HO-CH_2-HOCH_2-CH_2N-HOCH_2CH_2$ and $[EO]_x-[PO]_y-OH$ $$CH_3-[\underset{CH_3}{\overset{CH_3}{\underset{|}{\overset{|}{\text{Si}}}}}-\text{O}]_m-[\underset{(CH_2)_3}{\overset{CH_3}{\underset{|}{\overset{|}{\text{Si}}}}}-\text{O}]_p-[\underset{(CH_2)_3}{\overset{CH_3}{\underset{|}{\overset{|}{\text{Si}}}}}-\text{O}]_q-\underset{CH_3}{\overset{CH_3}{\underset{|}{\overset{|}{\text{Si}}}}}-CH_3$$

with side chains featuring $O=CH$, $CH=O$, $CH_2-CH_2$, $N$ bridge, and $[EO]_x-[PO]_y$ groups $$CH_3-[\underset{CH_3}{\overset{CH_3}{\underset{|}{\overset{|}{\text{Si}}}}}-\text{O}]_m-[\underset{(CH_2)_3}{\overset{CH_3}{\underset{|}{\overset{|}{\text{Si}}}}}-\text{O}]_p-\underset{CH_3}{\overset{CH_3}{\underset{|}{\overset{|}{\text{Si}}}}}-CH_3$$

with side chain: $[EO]_x$, $[PO]_y$, $CH_2$, $HO-CH_2$, $N(CH_2CH_2CH_3)_2$

Moreover, in some embodiments, a polysiloxane having the following general structure (2) may also be utilized in the present invention:

(2)

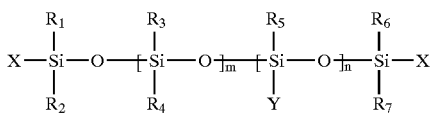
(2)

wherein,

X is hydrogen; hydroxyl; or straight chain, branched or cyclic, unsubstituted or substituted, $C_1$–$C_8$ alkyl or $C_1$–$C_8$ alkoxyl radical;

$R_1$–$R_7$ are independently, a straight chain, branched or cyclic, unsubstituted or substituted, $C_1$–$C_6$ alkyl radical;

m is 10 to 100,000;

n is 0 to 100,000;

Y is the following:

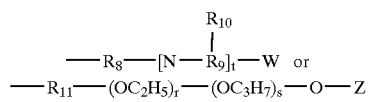

wherein, t is 0 or 1;

r is 10 to 100,000;

s is 10 to 100,000;

$R_8$, $R_9$, and $R_{11}$ are independently, a straight chain, branched or cyclic, unsubstituted or substituted, $C_2$–$C_8$ alkylene diradical;

$R_{10}$ is hydrogen or a straight chain, branched or cyclic, unsubstituted or substituted, $C_1$–$C_8$ alkyl radical;

W is the following:

or

wherein, $R_{12}$ and $R_{13}$ are independently, hydrogen or a straight chain, branched or cyclic, unsubstituted or substituted, $C_1$–$C_8$ alkyl or acyl radical; and $R_{14}$ is a straight chain, branched or cyclic, unsubstituted or substituted, $C_3$–$C_6$ alkylene diradical; and Z is hydrogen or a straight chain, branched or cyclic, unsubstituted or substituted, $C_1$–$C_{24}$ alkyl radical.

Representative species within the foregoing general structure (2) include the following (the terms "EO" and "PO" refer to "ethylene oxide" and "propylene oxide" moieties, respectively):

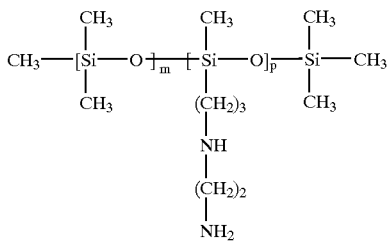

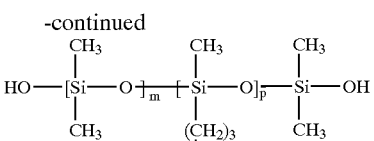

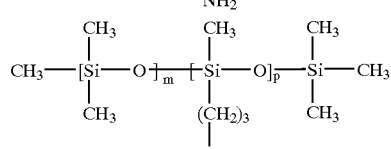

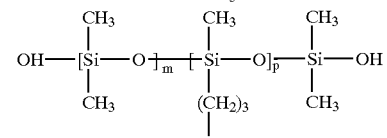

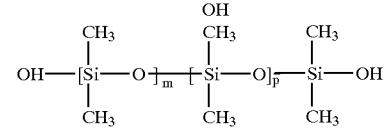

Several commercially available examples of polysiloxanes that are suitable for use in the present invention, as described above, include AF-21, AF-23 and Wetsoft CTW from Kelmar Industries of Duncan, S.C.; DC-8500, DC-8600, DC-8813, and DC-8220 from Dow Corning of Midland, Mich.; and GE-XF-42-B3115, GETSF-4703, GE-TSF-4707 and GE-TSF-4709 from GE Silicones of Waterford, N.Y.

Besides polysiloxanes, fatty and carboxylic acid derivatives may be utilized as the softener. Fatty acid derivatives, for instance, may have the following general structure (3):

$$R_1\text{—}X \quad (3)$$

wherein, $R_1$ is a straight, branched, or cyclic, saturated or unsaturated, substituted or unsubstitued, $C_8$ to $C_{34}$ alkyl radical, X is the following:

or

or

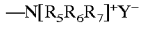

wherein,

A is an oxygen diradical or $NR_4$, where $R_4$ is hydrogen or a $C_1$–$C_4$ alkyl radical;

$R_2$ is a straight, branched, or cyclic, saturated or unsaturated, substituted or unsubstitued, $C_1$–$C_8$ alkyl radical;

when A is an oxygen diradical, $R_3$ is hydrogen, a cation (e.g., sodium or potassium), or a $C_1$–$C_6$ alky radical that is unsubstituted or substituted with nitrogen or other atoms, groups, or functionalities;

when A is an $NR_4$ radical, $R_3$ is hydrogen or a $C_1$–$C_4$ alkyl radical;

$R_5$, $R_6$, and $R_7$ are independently, hydrogen or a $C_1$–$C_8$ alkyl radical (e.g., $CH_3$); and Y is a counter ion, such as a halide (e.g., chloride) or sulfate.

Several commercially available examples of fatty acid derivatives that are suitable for use in the present invention, as described above, include Incroquat Behenyl TMC-85, Incroquat Erucyl HE, Volpo S-10, and Volpo 3 from Croda, Inc. of Parsippany, N.J.

Still other softeners may be utilized in the present invention. Some examples of such softeners can include, but are not limited to, quaternary ammonium compounds, and polyester polyquaternary ammonium compounds; imidazolinium compounds; bis-imidazolinium compounds; diquaternary ammonium compounds; polyquaternary ammonium compounds; ester-functional quaternary ammonium compounds (e.g., quaternized fatty acid trialkanolamine ester salts); phospholipid derivatives; mono- and polysaccharide derivatives; polyhydroxy hydrocarbons; and the like. Still other softeners are described in WO 02/16689, which is incorporated herein in its entirety by reference thereto for all purposes.

To increase or decrease the desired degree of hydrophobicity of the softener, the molecular weight of the softener can be increased to enhance hydrophobicity and decreased to enhance hydrophilicity. Similarly, the mole percent of any functional groups (e.g., amino groups) within the softener molecule can be changed to increase or decrease hydrophobicity. Further, a relatively hydrophobic softener can be blended with a more hydrophilic material, such as a polyether-modified polysiloxane, to decrease hydrophobicity. Those familiar with the softener art will also appreciate that the degree of substitution, the selected species for the various substituent groups and their chain lengths, the mole ratio of the components of a softener species, and the like, can be varied to affect the hydrophobicity of the softener. For instance, the ratio of propoxylate groups (PO) to ethoxylate groups (EO) (PO/EO), such as described above, can be adjusted to increase or decrease the hydrophobicity of the polysiloxane. In particular, by increasing the PO/EO ratio, the resulting polysiloxane can become more hydrophobic. For instance, in some embodiments, a hydrophobic polysiloxane is utilized that has an PO/EO ratio of greater than about 0.5, in some embodiments greater than about 1, and in some embodiments, greater than about 4. Further, when utilizing a modified polysiloxane, the ratio of the functional groups (e.g., amino) to the siloxane units is generally from about 1/10 to about 1/10,000, and the molecular weight of the modified polysiloxane is generally from about 5,000 to about 10,000,000.

Although the level of softeners within the softening composition may vary depending on the level of softness desired, the softeners typically constitute from about 5% to about 50% by weight of the softening composition, and in some embodiments, from about 10 to about 40% by weight of the softening composition.

Besides softeners, other optional compounds may also be included within the softening composition of the present invention. For example, the softening composition may contain a solvent. For instance, in one embodiment, water, aqueous-based solvents, and/or alcohol-based compounds can be utilized as a solvent of the softening composition. In particular, some solvents that are suitable for use in the present invention include, but are not limited to, water, methanol, ethanol, propanol, isopropanol, glycerin, propylene glycol, ethylene glycol, polypropylene glycol, polyethylene glycol, 1,3-methyl propanediol, isopentyldiol, etc. The solvent can be incorporated within the softening composition in various amounts. For example, the solvent can be utilized in the softening composition in an amount of from about 50% to about 95% by weight of the composition, and in some embodiments, from about 60% to about 90% by weight of the composition.

Still other components may be included within the softening composition. Examples of such materials include, but are not limited to: anti-microbial agents; odor absorbers; masking fragrances; anti-septic actives; anti-oxidants; astringents—cosmetic (induce a tightening or tingling sensation on skin); astringent—drug (a drug product which checks oozing, discharge, or bleeding when applied to skin or mucous membrane and works by coagulating protein); biological additives (enhance the performance or consumer appeal of the product); colorants (impart color to the product); emollients (help to maintain the soft, smooth, and pliable appearance of the skin by their ability to remain on the skin surface or in the stratum corneum to act as lubricants, to reduce flaking, and to improve the skin's appearance); external analgesics (a topically applied drug that has a topical analgesic, anesthetic, or antipruritic effect by depressing cutaneous sensory receptors, of that has a topical counterirritant effect by stimulating cutaneous sensory receptors); film formers (to hold active ingredients on the skin by producing a continuous film on skin upon drying); humectants (increase the water content of the top layers of the skin); natural moisturizing agents (NMF) and other skin moisturizing ingredients known in the art; opacifiers (reduce the clarity or transparent appearance of the product); preservatives; skin conditioning agents (e.g., Aloe Vera and Vitamin E); skin exfoliating agents (ingredients that increase the rate of skin cell turnover such as alpha hydroxy acids and beta hydroxyacids); skin protectants (a drug product which protects injured or exposed skin or mucous membrane surface from harmful or annoying stimuli); surfactants (e.g., nonionic, cationic, and/or amphoteric); and the like. For example, in one embodiment, the softening composition may contain from 0.01% to about 20% by weight of a surfactant; from 0.01% to about 10% by weight of a skin conditioning agent; and from about 0.01% to about 3% by weight of a preservative.

B. Tissue Product

The tissue product to which the softening composition is applied may generally have any construction and be made from any of a variety of materials. For example, the material used to make the tissue product can include fibers formed by a variety of pulping processes, such as kraft pulp, sulfite pulp, thermomechanical pulp, etc. The pulp fibers may include softwood fibers having an average fiber length of greater than 1 mm and particularly from about 2 to 5 mm based on a length-weighted average. Such softwood fibers can include, but are not limited to, northern softwood, southern softwood, redwood, red cedar, hemlock, pine (e.g., southern pines), spruce (e.g., black spruce), combinations thereof, and the like. Exemplary commercially available pulp fibers suitable for the present invention include those available from Kimberly-Clark Corporation under the trade designations "Longlac-19".

Hardwood fibers, such as eucalyptus, maple, birch, aspen, and the like, can also be used. In certain instances, eucalyptus fibers may be particularly desired to increase the softness of the web. Eucalyptus fibers can also enhance the brightness, increase the opacity, and change the pore structure of the web to increase its wicking ability. Moreover, if desired, secondary fibers obtained from recycled materials may be used, such as fiber pulp from sources such as, for example, newsprint, reclaimed paperboard, and office waste. Further, other natural fibers can also be used in the present invention, such as abaca, sabai grass, milkweed floss, pineapple leaf, and the like. In addition, in some instances, synthetic fibers can also be utilized. Some suitable synthetic fibers can include, but are not limited to, rayon fibers, ethylene vinyl alcohol copolymer fibers, polyolefin fibers, polyesters, and the like.

The tissue product of the present invention contains at least one paper web. The tissue product can be a single-ply tissue product in which the web forming the tissue is single-layered or stratified, i.e., has multiple layers, or a multiply tissue product in which the webs forming the multi-ply tissue product may themselves be either single or multi-layered. For instance, in one embodiment, a tissue product contains a ply formed from three layers where the outer layers include eucalyptus fibers and the inner layer includes northern softwood kraft fibers. If desired, the layers may also include blends of various types of fibers. However, it should be understood that the tissue product can include any number of plies or layers and can be made from various types of fibers.

Any process capable of making a paper web can be utilized in the present invention to form the tissue product. For example, a papermaking process of the present invention can utilize wet-pressing, creping, through-air-drying, creped through-air-drying, uncreped through-air-drying, single recreping, double recreping, calendering, embossing, air laying, as well as other steps in processing the paper web. Regardless of the particular technique used for forming the tissue product, it is generally desired that the tissue product contain elevated regions and non-elevated regions. Because the elevated regions generally define the surface that contacts the skin of a user, it may be desired to focus the application of various property-enhancing compositions on these elevated regions. In this manner, a lesser amount of the composition may be utilized than was previously required to impart the desired effect for tissue products having a relatively uniform surface.

Thus, one particular embodiment of the present invention for forming a tissue product with elevated regions and non-elevated regions is uncreped through-drying. Examples of such a technique are disclosed in U.S. Pat. No. 5,048,589 to Cook, et al.; U.S. Pat. No. 5,399,412 to Sudall, et al.; U.S. Pat. No. 5,510,001 to Hermans, et al.; U.S. Pat. No. 5,591,309 to Rugowski, et al.; and U.S. Pat. No. 6,017,417 to Wendt, et al., which are incorporated herein in their entirety by reference thereto for all purposes. Uncreped through-drying generally involves the steps of: (1) forming a furnish of cellulosic fibers, water, and optionally, other additives; (2) depositing the furnish on a traveling foraminous belt, thereby forming a fibrous web on top of the traveling foraminous belt; (3) subjecting the fibrous web to through-drying to remove the water from the fibrous web; and (4) removing the dried fibrous web from the traveling foraminous belt.

For example, referring to FIG. 1, one embodiment of a papermaking machine that can be used in forming an uncreped through-dried tissue product is illustrated. For simplicity, the various tensioning rolls schematically used to define the several fabric runs are shown but not numbered.

As shown, a papermaking headbox 10 can be used to inject or deposit a stream of an aqueous suspension of papermaking fibers onto an upper forming fabric 12. The aqueous suspension of fibers is then transferred to a lower forming fabric 13, which serves to support and carry the newly-formed wet web 11 downstream in the process. If desired, dewatering of the wet web 11 can be carried out, such as by vacuum suction, while the wet web 11 is supported by the forming fabric 13.

The wet web 11 is then transferred from the forming fabric 13 to a transfer fabric 17 while at a solids consistency of from about 10% to about 35%, and particularly, from about 20% to about 30%. As used herein, a "transfer fabric" is a fabric that is positioned between the forming section and the drying section of the web manufacturing process. In this embodiment, the transfer fabric 17 is a patterned fabric having protrusions or impression knuckles, such as described in U.S. Pat. No. 6,017,417 to Wendt et al. Typically, the transfer fabric 17 travels at a slower speed than the forming fabric 13 to enhance the "MD stretch" of the web, which generally refers to the stretch of a web in its machine or length direction (expressed as percent elongation at sample failure). For example, the relative speed difference between the two fabrics can be from 0% to about 80%, in some embodiments greater than about 10%, in some embodiments from about 10% to about 60%, and in some embodiments, from about 15% to about 30%. This is commonly referred to as "rush" transfer. One useful method of performing rush transfer is taught in U.S. Pat. No. 5,667,636 to Engel et al., which is incorporated herein in its entirety by reference thereto for all purposes.

Transfer to the fabric 17 may be carried out with the assistance of positive and/or negative pressure. For example, in one embodiment, a vacuum shoe 18 can apply negative pressure such that the forming fabric 13 and the transfer fabric 17 simultaneously converge and diverge at the leading edge of the vacuum slot. Typically, the vacuum shoe 18 supplies pressure at levels from about 10 to about 25 inches of mercury. As stated above, the vacuum transfer shoe 18 (negative pressure) can be supplemented or replaced by the use of positive pressure from the opposite side of the web to blow the web onto the next fabric. In some embodiments, other vacuum shoes can also be used to assist in drawing the fibrous web 11 onto the surface of the transfer fabric 17.

From the transfer fabric 17, the fibrous web 11 is then transferred to the through-drying fabric 19. When the wet web 11 is transferred to the fabric 19. While supported by the through-drying fabric 19, the web 11 is then dried by a through-dryer 21 to a solids consistency of about 90% or greater, and in some embodiments, about 95% or greater. The through-dryer 21 accomplishes the removal of moisture by passing air therethrough without applying any mechanical pressure. Through-drying can also increase the bulk and softness of the web. In one embodiment, for example, the through-dryer 21 can contain a rotatable, perforated cylinder and a hood for receiving hot air blown through perforations of the cylinder as the through-drying fabric 19 carries the web 11 over the upper portion of the cylinder. The heated air is forced through the perforations in the cylinder of the through-dryer 21 and removes the remaining water from the web 11. The temperature of the air forced through the web 11 by the through-dryer 21 can vary, but is typically from about 100° C. to about 250° C. It should also be understood that other non-compressive drying methods, such as microwave or infrared heating, can be used.

A variety of conventional papermaking additives may be applied to the tissue product before, during, and/or after its formation. For example, in some embodiments, a wet strength agent can be utilized, to further increase the strength of the tissue product. As used herein, a "wet strength agent" is any material that, when added to cellulosic fibers, can provide a resulting web or sheet with a wet geometric tensile strength to dry geometric tensile strength ratio in excess of about 0.1. Typically these materials are termed either "permanent" wet strength agents or "temporary" wet strength agents. As is well known in the art, temporary and permanent wet strength agents may also sometimes function as dry strength agents to enhance the strength of the tissue product when dry.

Suitable permanent wet strength agents are typically water soluble, cationic oligomeric or polymeric resins that are capable of either crosslinking with themselves (homocrosslinking) or with the cellulose or other constituents of the wood fiber. Examples of such compounds are described in U.S. Pat. Nos. 2,345,543; 2,926,116; and 2,926,154. One class of such agents includes polyamine-epichlorohydrin, polyamide epichlorohydrin or polyamide-amine epichlorohydrin resins, collectively termed "PAE resins". Examples of these materials are described in U.S. Pat. No. 3,700,623 to Keim and U.S. Pat. No. 3,772,076 to Keim, which are sold by Hercules, Inc., Wilmington, Del. under the trade designation "Kymene", e.g., Kymene 557H or 557 LX. Kymene 557 LX, for example, is a polyamide epicholorohydrin polymer that contains both cationic sites, which can form ionic bonds with anionic groups on the pulp fibers, and azetidinium groups, which can form covalent bonds with carboxyl groups on the pulp fibers and crosslink with the polymer backbone when cured. Other suitable materials include base-activated polyamide-epichlorohydrin resins, which are described in U.S. Pat. No. 3,885,158 to Petrovich; U.S. Pat. No. 3,899,388 to Petrovich; U.S. Pat. No. 4,129,528 to Petrovich; U.S. Pat. No. 4,147,586 to Petrovich; and U.S. Pat. No. 4,222,921 to van Eanam. Polyethylenimine resins may also be suitable for immobilizing fiber-fiber bonds. Another class of permanent-type wet strength agents includes aminoplast resins (e.g., urea-formaldehyde and melamine-formaldehyde).

Temporary wet strength agents can also be useful in the present invention. Suitable temporary wet strength agents can be selected from agents known in the art such as dialdehyde starch, polyethylene imine, mannogalactan gum, glyoxal, and dialdehyde mannogalactan. Also useful are glyoxylated vinylamide wet strength resins as described in U.S. Pat. No. 5,466,337 to Darlington, et al. Useful water-soluble resins include polyacrylamide resins such as those sold under the Parez trademark, such as Parez 631NC, by Cytec Industries of Stamford, Conn. Such resins are generally described in U.S. Pat. No. 3,556,932 to Coscia, et al. and U.S. Pat. No. 3,556,933 to Williams, et al. For example, the "Parez" resins typically include a polyacrylamide-glyoxal polymer that contains cationic hemiacetal sites that can form ionic bonds with carboxyl or hydroxyl groups present on the cellulosic fibers. These bonds can provide increased strength to the web of pulp fibers. In addition, because the hemicetal groups are readily hydrolyzed, the wet strength provided by such resins is primarily temporary. U.S. Pat. No. 4,605,702 to Guerro, et al. also describes suitable temporary wet strength resins made by reacting a vinylamide polymer with glyoxal, and then subjecting the polymer to an aqueous base treatment. Similar resins are also described in U.S. Pat. No. 4,603,176 to Biorkquist, et al.; U.S. Pat. No. 5,935,383 to Sun, et al.; and U.S. Pat. No. 6,017,417 to Wendt, et al.

C. Softening Composition Application

The softening composition may be applied to the tissue product before, during, and/or after its formation. Generally speaking, the softening composition is applied to the web while at a solids consistency of greater than about 20%. In some embodiments, the softening composition may be applied to webs that are substantially dry, i.e., have a solids consistency of about 90% or greater, and in some embodiments, 95% or greater. Moreover, to facilitate deposition of the softening composition on primarily the elevated regions of the tissue product, it is generally applied using foam deposition techniques, such as set forth in WO 02/16689. For instance, in one embodiment, the softening composition may be metered to a foaming system where it may be combined with a gas, such as compressed air, in various proportions. For example, to ensure that the resulting foam is generally stable, the ratio of air volume to liquid volume in the foam (i.e., blow ratio) may be greater than about 3:1, in some embodiments from about 5:1 to about 180:1, in some embodiments from about 10:1 to about 100:1, and in some embodiments, from about 20:1 to about 60:1. For instance, in one embodiment, a blow ratio of about 30:1 may be obtained from a liquid flow rate of 113 cubic centimeters per minute and an air flow rate of 3400 cubic centimeters per minute. In another embodiment, a blow ratio of about 20:1 may be obtained from a liquid flow rate of 240 cubic centimeters per minute and an air flow rate of 4800 cubic centimeters per minute.

Within the foaming system, a foam generator may combine the air and the softening composition at a certain energy so that a foam may form. In one embodiment, for example, the foam generator rotates at a certain speed so as to cause the softening composition to pass through a series of edges, which allow trailing eddy currents of air to entrain into the softening composition. In particular, the foam generator may operate at speeds from about 300 revolutions per minute (rpm) to about 700 rpm, and more particularly from about 400 rpm to about 600 rpm. For example, suitable foam generators are described in U.S. Pat. No. 4,237,818 issued to Clifford et al., which is incorporated herein in its entirety by reference thereto for all purposes. Moreover, one commercially available foam generator that may be utilized in the present invention may be obtained from Gaston Systems, located in Stanley, N.C.

The characteristics of the resulting foam may vary, depending on the parameters of the foam generator utilized, the ratio of the volume of gas to the volume of the softening composition, etc. For instance, in some embodiments, the foam may have a "half-life" that allows the foam to travel from the foam generator to an applicator before collapsing. In some embodiments, a foam bubble may have a half-life of greater than about 1 minute, in some embodiments greater than about 3 minutes, in some embodiments from about 3 minutes to about 30 minutes, and in some embodiments, from about 15 minutes to about 25 minutes. The half-life of the foam may generally be determined in the following manner. A calibrated beaker is positioned on a scale and placed under a 500 cubic centimeter separator funnel. Approximately 50 grams of a foam sample is then collected into the separator funnel. As soon as all of the foam is placed in the funnel, a standard stopwatch is started. When approximately 25 grams of liquid collects into the calibrated beaker, the time is stopped and recorded. This recorded time is the foam half-life.

In some instances, the average cell size, wall thickness, and/or density may also foster the stability of the foam. For instance, the foam may have a size, thickness, or density such as described in U.S. Pat. No. 4,099,913 issued to Walter, et al. and U.S. Pat. No. 5,985,434 issued to Qin, et al., which are incorporated herein in their entirety by reference thereto for all purposes. For example, in one embodiment, the average cell size of the foam cell may be from about 10 microns to about 100 microns. Moreover, the average wall thickness of the foam cell may be from about 0.1 micron to about 30 microns.

After generation, the foam is then forced out of the foam generator, where it may travel via one or more conduits to a foam applicator to be applied to a paper web. The diameter of the conduits, the length of the conduits, the pressure of the foam bubbles after exiting the foam generator, and the like, may all be controlled to vary the nature of foam application. For instance, in one embodiment, a conduit having an inner diameter from about 0.375 inches to about 1.5 inches may be utilized to process from about 10 to about 3000 cubic centimeters of air per minute, such as from about 300 to about 3000 cubic centimeters of air per minute and about 20 to about 300 grams of liquid per minute. Moreover, in one embodiment, the length of the conduit may be about 50 feet in length. In addition, upon exiting the foam generator, the pressure of the foam bubbles may be from about 5 psi to about 90 psi, and more particularly from about 30 psi to about 60 psi.

Once the foam exits the foam generator, it may then be supplied to a foam applicator. In general, any foam applicator that is capable of applying a foam, such as described above, onto a paper web may be used in the present invention. For instance, referring to FIG. 2, a foam applicator that can be used to apply the foam to the dried web is illustrated. As shown, the foam applicator 136 contains a distribution chamber 140 and an extrusion head 142. Any of a variety of distribution chambers and/or extrusion heads can be utilized in a foam applicator of the present invention.

For example, as shown, in one embodiment, the distribution chamber 140 is substantially parabolic in shape. In this embodiment, the substantially parabolic shape can allow the foam bubbles to travel the same distance, at the same velocity, for the same length of time, thereby enhancing the uniformity of foam application. It should be understood, however, that the present invention is not limited to any specific distribution chamber design. For example, one example of a suitable distribution chamber is described in U.S. Pat. No. 4,237,818 to Clifford, et al.

As the foam enters the distribution chamber 140, it is initially forced upward to assure that any decaying foam collects therein for automatic draining. Thereafter, it is forced downward, as indicated by the arrows in FIG. 2, through the distribution chamber 140 to the extrusion head 142. In general, extrusion heads having any of a variety of shapes and sizes can be used in the present invention. For example, in one embodiment, "straight slot" extrusion heads, such as disclosed in U.S. Pat. No. 4,237,818 to Clifford, et al. and U.S. Pat. No. 4,581,254 to Cunningham, et al., which are incorporated herein in their entirety by reference thereto for all purposes, can be utilized. As used herein, a "straight slot" extrusion head generally refers to an application head having parallel nozzle bars. In one embodiment, for example, a "straight slot" extrusion head includes two parallel nozzle bars that form an extrusion slot which is generally from about 0.025 inches to about 0.5625 inches in width, and in some embodiments, from about 0.050 inches to about 0.0626 inches in width. For instance, in one embodiment, the width is about 0.125 inches. In another embodiment, the width is about 0.1875 inches. Moreover, the length of the bars is typically such that the extrusion slot has a length from about 0.125 inches to about 6 inches. The length of the slot, however, can be varied as desired to adjust the web handling land area. For example, in one embodiment, the length of the extrusion slot can be about 0.187 inches. In addition, a wiper plate can also be attached to one or both of the nozzle bars to help adhere the foam to the web.

If desired, one or both of the upper lips of the parallel bars of the extrusion head can also be configured to apply a certain amount of tension to the web when contacted therewith. For instance, in one embodiment, as a web is pulled over the foam applicator, it first contacts a first upper lip of one parallel nozzle bar and then contacts a second upper lip of the other parallel nozzle bar. As the web is pulled over the first and second upper lips, foam can be applied to the bottom surface of the web through the extrusion slot defined by the parallel nozzle bars.

In general, the size of the upper lips can be varied as desired. For instance, the upper lips can have a radius up to about 0.50 inches. In some embodiments, it may be desired to utilize a first upper lip having a relatively narrow radius, such as less than about 0.01 inches, and more particularly less than about 0.05 inches. By utilizing a relatively narrow first upper lip, a high pressure point can be created. This high pressure point allows the "boundary air layer" located directly below the web to be minimized. As used herein, a "boundary air layer" generally refers to a layer of air located adjacent to a moving web. Because webs used in tissue formation typically have relatively low basis weights and strengths, boundary air layers often inhibit the ability to control the position of the traveling web. As such, by minimizing the boundary air layer, such as described above, the efficiency of foam application can be enhanced. It should be understood that various other mechanisms can be utilized to minimize the boundary air layer. For example, in some embodiments, vacuum rolls or boxes can be utilized to remove the boundary air layer. Moreover, it should also be understood that any method or apparatus for applying a foam to a web can be used in the present invention, and that the foam applicator depicted and described herein is for illustrative purposes only.

Referring again to FIG. 2, the foam is generally extruded onto the moving web 123 from the extrusion head 142, as described above. In particular, by exerting sufficient tension in the moving web, it can generally be kept in uniform contact with the upper surfaces of the head 142 against the pressure of the foam within the head 142. Thus, as it moves, the web 123 can "tear away" portions of the foam bubbles located near the upper surfaces of the head 142. Moreover, small portions of the foam bubbles can also be blown onto the web. Specifically, the foam bubbles remain under pressure until the instant of application to tissue web 123 so that the liquid forming the bubbles can be blown onto the substrate by the rapidly expanding air released from the bubbles. In some embodiments, excess foam can also be collected by collection troughs 155 and recycled through a line 156.

Figure 2:
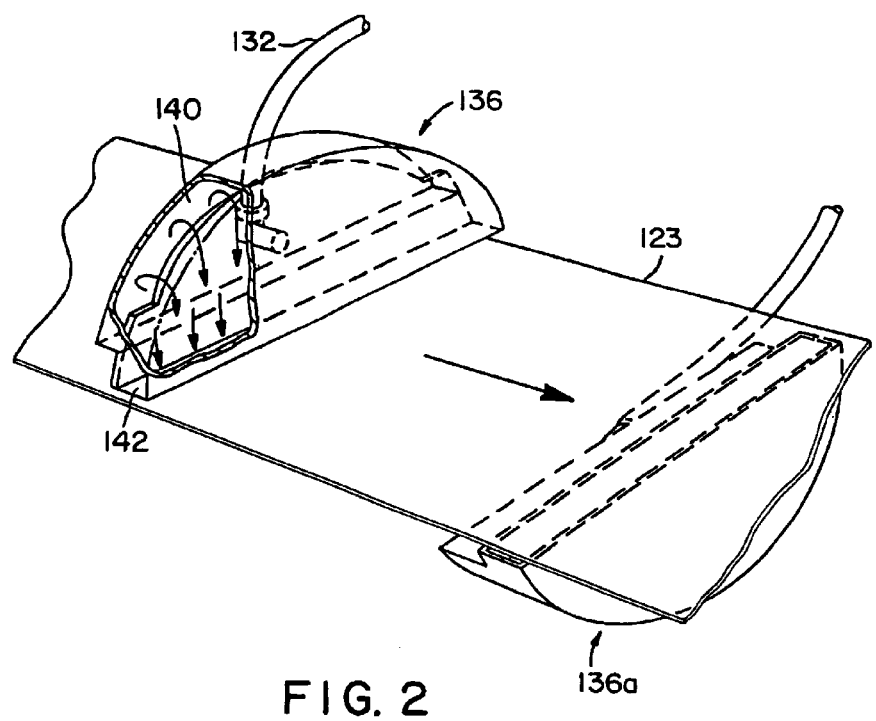
FIG. 2 is a perspective view of one embodiment of top and bottom foam applicators used to apply the softening composition to a paper web.

Although the use of only one foam applicator 136 is described in detail herein, it should be understood that any number of foam applicators may be used. For instance, as shown in FIG. 2, a first foam applicator 136 is shown as depositing a foam composition onto the top surface of the web 123, while a second applicator 136a is shown as depositing a foam composition on the bottom surface of the web 123. The foam applicator 136a may be the same or different than the foam applicator 136. Moreover, although not required, it is typically desired that the foam applicators 136 and 136a be positioned in a staggered configuration so that the web 123 can be better deflected around the applicators. It should also be understood that other applicators can be utilized in conjunction with the applicators 136 and 136a to deposit foam compositions onto the top and/or bottom surfaces of the web 123.

Other materials may be utilized in conjunction with the softening composition when applied as a foam to the tissue product. For example, a variety of foaming aids may be applied to the softening composition. Foaming aids may be useful in facilitating the generation of foam. A foaming aid may also be useful in stabilizing existing foam. In general, any of a variety of foaming aids may be applied to the softening composition. In particular, foaming aids that have a low critical miscelle concentration, are cationic and/or amphoteric, and have small bubble sizes are typically utilized. Some examples of suitable foaming aids include, but are not limited to, fatty acid amines, amides, and/or amine oxides; fatty acid quaternary compounds; electrolytes (to help achieve foam stability); and the like. Some commercially available foaming aids that are suitable in the present invention are Mackernium 516, Mackam 2C, and Mackam CBS-50G made by McIntyre Group, Ltd. When utilized, the foaming aids can sometimes be incorporated into the softening composition in an amount of from about 0.1 to about 20% by weight of the softening composition, and in some embodiments, from about 2% by weight to about 5% by weight of the softening composition.

D. Properties

Figure 3:
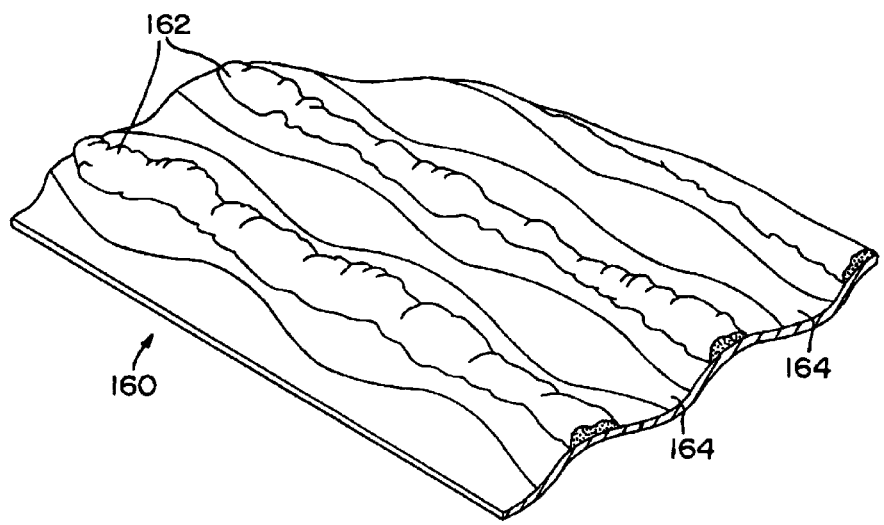
FIG. 3 is a perspective view of a paper web having elevated regions applied with the softening composition according to one embodiment of the present invention.

Due to the deposition controllability provided by the foam application techniques used in the present invention, the softening composition may be applied to primarily the elevated regions of the tissue product. For example, 75 wt. % or greater, and in some embodiments, 90 wt. % or greater of the softening composition is applied to the elevated regions of the tissue product. In this regard, referring to FIG. 3, a web 160 is illustrated in which a softening composition primarily resides on the elevated regions 162 as opposed to the non-elevated regions 164. As discussed above, such elevated regions 162 may be imparted by an uncreped through-drying papermaking process.

The deposition of the softening composition primarily on the elevated regions of a tissue product has a variety of unexpected benefits. For instance, it is believed that the Wet Out Time of the tissue product may be maintained at the desired level even when using relatively hydrophobic softeners. As indicated above, the Wet Out Time is generally a measure of the absorbent rate of a tissue product, where an increase in Wet Out Time corresponds to a decrease in absorbent rate. Conventionally, the application of hydrophobic softeners resulted in a substantial increase in the Wet Out Time of the tissue product due to their tendency to repel water from the surface of the tissue product. However, by being applied primarily to the elevated regions of the tissue product, the non-elevated regions remain relatively free of the hydrophobic softener. As such, the none-levated regions can continue to absorb water at approximately the same rate as the untreated tissue product. Thus, in accordance with the present invention, the Wet Out Time is maintained at a good level, such as less than about 10 seconds, in some embodiments less than about 8 seconds, in some embodiments less than about 6 seconds, and in some embodiments, less than about 5 seconds.

Moreover, the amount of the softener required to impart the desired soft feel to the tissue product may also be reduced. Unlike the case in which a softening composition is uniformly applied to a skin-contacting surface of a tissue product, application to primarily the elevated regions maximizes the use of the softener for contact with a user's skin.

Thus, because the softener is more effectively deposited on the tissue product, a lesser amount may be utilized. For example, in some embodiments, the softening composition is utilized in an amount of from about 0.05% to about 5% by weight of the tissue product, in some embodiments, from about 0.1% to about 2% by weight of the tissue product, and in some embodiments, from about 0.2% to about 1% by weight of the tissue product.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method for forming a tissue product, said method comprising:

forming a paper web having a surface that contains elevated regions and non-elevated regions; and foaming a softening composition that contains at least one softener onto said surface of said paper web so that a greater amount of said softening composition resides on said elevated regions than on said non-elevated regions, wherein said softening composition comprises from about 0.05% to about 5% by weight of the tissue product and wherein the tissue product has a Wet Out Time less than about 10 seconds.

2. A method as defined in claim 1, wherein said softener is a polysiloxane.

3. A method as defined in claim 1, wherein said softener is hydrophobic.

4. A method as defined in claim 3, wherein said softener is selected from the group consisting of polysiloxanes, fatty acid derivatives, and combinations thereof.

5. A method as defined in claim 3, wherein said softener is an amino-functionalized polysiloxane.

6. A method as defined in claim 1, wherein said softener is a polysiloxane having the following general structure:

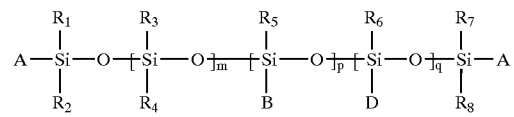

wherein,

A is hydrogen; hydroxyl; or straight chain, branched or cyclic, unsubstituted or substituted, $C_1$–$C_8$ alkyl or alkoxy radicals;

$R_1$–$R_8$ are independently, a straight chain, branched or cyclic, unsubstituted or substituted, $C_1$–$C_6$ alkyl radical;

m is from 20 to 100,000;

p is from 1 to 5,000;

q is from 0 to 5,000;

B is the following:

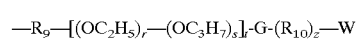

wherein, t=0 or 1;

z is 0 or 1;

r is from 1 to 50,000;

s is from 0 to 50,000;

$R_9$ is a straight chain, branched or cyclic, unsubstituted or substituted, $C_2$–$C_8$ alkylene diradical;

$R_{10}$ is a straight chain, branched or cyclic, unsubstituted or substituted, $C_2$–$C_8$ alkylene diradical or an alkyl cyclic ethereal radical;

G is oxygen or $NR_{11}$, where $R_{11}$ is hydrogen or a straight chain, branched or cyclic, unsubstituted or substituted, $C_1$ to $C_8$ alkyl radical;

when z=0, W is hydrogen or a straight chain, branched or cyclic, unsubstituted or substituted, $C_1$ to $C_{22}$ alkyl radical;

when z=1, W is hydrogen, an —$NR_{12}R_{13}$ radical, or an —$NR_{14}$ radical;

wherein, $R_{12}$ and $R_{13}$ are independently, hydrogen or a straight chain, branched or cyclic, unsubstituted or substituted, $C_1$–$C_8$ alkyl radical; and $R_{14}$ is a straight chain, branched or cyclic, unsubstituted or substituted, $C_3$ to $C_8$ alkylene diradical that forms a cyclic ring with the nitrogen;

D is the following:

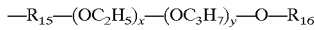

wherein, x is from 1 to 10,000;

y is from 0 to 10,000;

$R_{15}$ is a straight chain, branched or cyclic, unsubstituted or substituted, $C_2$–$C_8$ alkylene diradical, $R_{16}$ is hydrogen or a straight chain, branched or cyclic, unsubstituted or substituted, $C_1$–$C_8$ alkyl radical.

7. A method as defined in claim 1, wherein said softener is a polysiloxane having the following general structure:

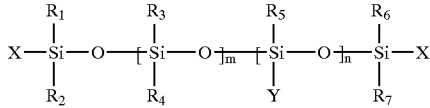

wherein,

X is hydrogen; hydroxyl; or straight chain, branched or cyclic, unsubstituted or substituted, $C_1$–$C_8$ alkyl or $C_1$–$C_8$ alkoxyl radical;

$R_1$–$R_7$ are independently, a straight chain, branched or cyclic, unsubstituted or substituted, $C_1$–$C_6$ alkyl radical;

m is 10 to 100,000;

n is 0 to 100,000;

Y is the following:

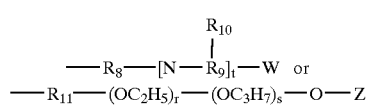

wherein, t is 0 or 1;

r is 10 to 100,000;

s is 10 to 100,000;

$R_8$, $R_9$, and $R_{11}$ are independently, a straight chain, branched or cyclic, unsubstituted or substituted, $C_2$–$C_8$ alkylene diradical;

$R_{10}$ is hydrogen or a straight chain, branched or cyclic, unsubstituted or substituted, $C_1$–$C_8$ alkyl radical;

W is the following:

or

wherein, $R_{12}$ and $R_{13}$ are independently, hydrogen or a straight chain, branched or cyclic, unsubstituted or substituted, $C_1$–$C_8$ alkyl or acyl radical; and $R_{14}$ is a straight chain, branched or cyclic, unsubstituted or substituted, $C_3$–$C_6$ alkylene diradical; and Z is hydrogen or a straight chain, branched or cyclic, unsubstituted or substituted, $C_1$–$C_{24}$ alkyl radical.

8. A method as defined in claim 1, wherein said softener is a fatty acid derivative having the following general structure:

wherein, $R_1$ is a straight, branched, or cyclic, saturated or unsaturated, substituted or unsubstituted, $C_8$ to $C_{34}$ alkyl radical, X is the following:

or

or

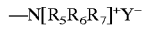

wherein,

A is an oxygen diradical or $NR_4$ where $R_4$ is hydrogen or a $C_1$–$C_4$ alkyl radical;

$R_2$ is a straight, branched, or cyclic, saturated or unsaturated, substituted or unsubstituted, $C_1$–$C_8$ alkyl radical;

when A is an oxygen diradical, $R_3$ is hydrogen, cation, or a $C_1$–$C_6$ alky radical that is unsubstituted or substituted with nitrogen or other atoms, groups, or functionalities;

when A is an $NR_4$ radical, $R_3$ is hydrogen or a $C_1$–$C_4$ alkyl radical;

$R_5$, $R_6$, and $R_7$ are independently, hydrogen or a $C_1$–$C_8$ alkyl radical; and Y is a counter ion.

9. A method as defined in claim 1, wherein said paper web is formed by a through-drying process.

10. A method as defined in claim 9, wherein said paper web is uncreped.

11. A method as defined in claim 1, wherein said foam composition has a half-life of greater than about 3 minutes and a blow ratio greater than about 3:1 before being applied to said web.

12. A method as defined in claim 1, wherein the Wet Out Time of the tissue product is less than about 8 seconds.

13. A method as defined in claim 1, wherein the Wet Out Time of the tissue product is less than about 6 seconds.

14. A method as defined in claim 1, wherein the Wet Out Time of the tissue product is less than about 5 seconds.

15. A method as defined in claim 1, wherein said softening composition comprises from about 0.1% to about 2% by weight of the tissue product.

16. A method as defined in claim 1, wherein said softening composition comprises from about 0.2% to about 1% by weight of the tissue product.

17. A method for forming a tissue product, said method comprising:
forming a through-dried paper web having a surface that contains elevated regions and non-elevated regions; and
foaming a softening composition that contains at least one hydrophobic softener onto said surface of said paper web so that a greater amount of said softening composition resides on the elevated regions than on the non-elevated regions, wherein said softening composition comprises from about 0.1% to about 2% by weight of the tissue product and wherein the tissue product has a Wet Out Time less than about 8 seconds.

18. A method as defined in claim 17, wherein said paper web is uncreped.

19. A method as defined in claim 17, wherein said softener is selected from the group consisting of polysiloxanes, fatty acid derivatives, and combinations thereof.

20. A method as defined in claim 17, wherein said softener is an amino-functionalized polysiloxane.

21. A method as defined in claim 17, wherein the Wet Out Time of the tissue product is less than about 6 seconds.

22. A method as defined in claim 17, wherein the Wet Out Time of the tissue product is less than about 5 seconds.

23. A method as defined in claim 17, wherein said softening composition comprises from about 0.2% to about 1% by weight of the tissue product.

24. A tissue product comprising:
a paper web that defines a skin-contacting surface of the tissue product, said surface containing elevated regions and non-elevated regions, wherein a softening composition that includes at least one softener is foamed on said surface so that a greater amount of said softening composition resides on said elevated regions than on said non-elevated regions, wherein said softening composition comprises from about 0.05% to about 5% by weight of the tissue product and wherein the tissue product has a Wet Out Time less than about 10 seconds.

25. A tissue product as defined in claim 24, wherein said softener is a polysiloxane.

26. A tissue product as defined in claim 24, wherein said softener is hydrophobic.

27. A tissue product as defined in claim 24, wherein said softener is selected from the group consisting of polysiloxanes, fatty acid derivatives, and combinations thereof.

28. A tissue product as defined in claim 24, wherein said softener is an amino-functionalized polysiloxane.

29. A tissue product as defined in claim 24, wherein said softener is a polysiloxane having the following general structure:

$$A-\underset{R_2}{\overset{R_1}{Si}}-O-[\underset{R_4}{\overset{R_3}{Si}}-O]_m-[\underset{B}{\overset{R_5}{Si}}-O]_p-[\underset{D}{\overset{R_6}{Si}}-O]_q-\underset{R_8}{\overset{R_7}{Si}}-A$$

wherein,
A is hydrogen; hydroxyl; or straight chain, branched or cyclic, unsubstituted or substituted, $C_1$–$C_8$ alkyl or alkoxy radicals;
$R_1$–$R_8$ are independently, a straight chain, branched or cyclic, unsubstituted or substituted, $C_1$–$C_6$ alkyl radical;
m is from 20 to 100,000;
p is from 1 to 5,000;
q is from 0 to 5,000;
B is the following:

$$-R_9-[(OC_2H_5)_r-(OC_3H_7)_s]_t-G-(R_{10})_z-W$$

wherein,
t=0 or 1;
z is 0 or 1;
r is from 1 to 50,000;
s is from 0 to 50,000;
$R_9$ is a straight chain, branched or cyclic, unsubstituted or substituted, $C_2$–$C_8$ alkylene diradical;
$R_{10}$ is a straight chain, branched or cyclic, unsubstituted or substituted, $C_2$–$C_8$ alkylene diradical or an alkyl cyclic ethereal radical;
G is oxygen or $NR_{11}$, where $R_{11}$ is hydrogen or a straight chain, branched or cyclic, unsubstituted or substituted, $C_1$ to $C_8$ alkyl radical;
when z=0, W is hydrogen or a straight chain, branched or cyclic, unsubstituted or substituted, $C_1$ to $C_{22}$ alkyl radical;
when z=1, W is hydrogen, an —$NR_{12}R_{13}$ radical, or an —$NR_{14}$ radical;
wherein,
$R_{12}$ and $R_{13}$ are independently, hydrogen or a straight chain, branched or cyclic, unsubstituted or substituted, $C_1$–$C_8$ alkyl radical; and
$R_{14}$ is a straight chain, branched or cyclic, unsubstituted or substituted, $C_3$ to $C_8$ alkylene diradical that forms a cyclic ring with the nitrogen;
D is the following:

$$-R_{15}-(OC_2H_5)_x-(OC_3H_7)_y-O-R_{16}$$

wherein,
x is from 1 to 10,000;
y is from 0 to 10,000;
$R_{15}$ is a straight chain, branched or cyclic, unsubstituted or substituted, $C_2$–$C_8$ alkylene diradical,
$R_{16}$ is hydrogen or a straight chain, branched or cyclic, unsubstituted or substituted, $C_1$–$C_8$ alkyl radical.

30. A tissue product as defined in claim 24, wherein said softener is a polysiloxane having the following general structure:

$$X-\underset{R_2}{\overset{R_1}{Si}}-O-[\underset{R_4}{\overset{R_3}{Si}}-O]_m-[\underset{Y}{\overset{R_5}{Si}}-O]_n-\underset{R_7}{\overset{R_6}{Si}}-X$$

wherein,
X is hydrogen; hydroxyl; or straight chain, branched or cyclic, unsubstituted or substituted, $C_1$–$C_8$ alkyl or $C_1$–$C_8$ alkoxyl radical;
$R_1$–$R_7$ are independently, a straight chain, branched or cyclic, unsubstituted or substituted, $C_1$–$C_6$ alkyl radical;
m is 10 to 100,000;
n is 0 to 100,000;

Y is the following:

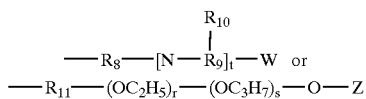

wherein,
t is 0 or 1;
r is 10 to 100,000;
s is 10 to 100,000;
$R_8$, $R_9$, and $R_{11}$ are independently, a straight chain, branched or cyclic, unsubstituted or substituted, $C_2$–$C_8$ alkylene diradical;
$R_{10}$ is hydrogen or a straight chain, branched or cyclic, unsubstituted or substituted, $C_1$–$C_8$ alkyl radical;
W is the following:

or

wherein,
$R_{12}$ and $R_{13}$ are independently, hydrogen or a straight chain, branched or cyclic, unsubstituted or substituted, $C_1$–$C_8$ alkyl or acyl radical; and
$R_{14}$ is a straight chain, branched or cyclic, unsubstituted or substituted, $C_3$–$C_6$ alkylene diradical; and Z is hydrogen or a straight chain, branched or cyclic, unsubstituted or substituted, $C_1$–$C_{24}$ alkyl radical.

31. A tissue product as defined in claim 24, wherein said softener is a fatty acid derivative having the following general structure:

wherein,
$R_1$ is a straight, branched, or cyclic, saturated or unsaturated, substituted or unsubstituted, $C_8$ to $C_{34}$ alkyl radical, X is the following:

or

or

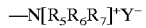

wherein,
A is an oxygen diradical or $NR_4$, where $R_4$ is hydrogen or a $C_1$–$C_4$ alkyl radical;
$R_2$ is a straight, branched, or cyclic, saturated or unsaturated, substituted or unsubstituted, $C_1$–$C_8$ alkyl radical;
when A is an oxygen diradical, $R_3$ is hydrogen, cation, or a $C_1$–$C_6$ alky radical that is unsubstituted or substituted with nitrogen or other atoms, groups, or functionalities;
when A is an $NR_4$ radical, $R_3$ is hydrogen or a $C_1$–$C_4$ alkyl radical;
$R_5$, $R_6$, and $R_7$ are independently, hydrogen or a $C_1$–$C_8$ alkyl radical; and
Y is a counter ion.

32. A tissue product as defined in claim 24, wherein said paper web is a through-dried web.

33. A tissue product as defined in claim 32, wherein said paper web is uncreped.

34. A tissue product as defined in claim 24, wherein the Wet Out Time of the tissue product is less than about 8 seconds.

35. A tissue product as defined in claim 24, wherein the Wet Out Time of the tissue product is less than about 6 seconds.

36. A tissue product as defined in claim 24, wherein the Wet Out Time of the tissue product is less than about 5 seconds.

37. A tissue product as defined in claim 24, wherein said softening composition comprises from about 0.1% to about 2% by weight of the tissue product.

38. A tissue product as defined in claim 24, wherein said softening composition comprises from about 0.2% to about 1% by weight of the tissue product.

* * * * *

UNITED STATES PATENT AND TRADEMARK OFFICE
CERTIFICATE OF CORRECTION

| | |
|---|---|
| PATENT NO. | : 6,977,026 B2 |
| APPLICATION NO. | : 10/272470 |
| DATED | : December 20, 2005 |
| INVENTOR(S) | : Kou-Chang Liu, Daniel Vander Heiden and Strong C. Chuang |

It is certified that error appears in the above-identified patent and that said Letters Patent is hereby corrected as shown below:

On Title Page: Item (57)

Under Foreign Patent Documents "EP 10590321" should be --EP 1059032--

Under Other Publications an additional PCT Search Report should be listed as PCT Search Report for PCT/US03/28239 03/03/04.

Column 22, line 19, "alky radical" should be --alkyl radical--

Signed and Sealed this

Third Day of April, 2007

JON W. DUDAS
*Director of the United States Patent and Trademark Office*